United States Patent
Kawamura et al.

(10) Patent No.: US 7,194,675 B2
(45) Date of Patent: Mar. 20, 2007

(54) BACKUP METHOD, BACKUP SYSTEM, DISK CONTROLLER AND BACKUP PROGRAM

(75) Inventors: Nobuo Kawamura, Atsugi (JP); Yoshio Suzuki, Kokubunji (JP); Satoru Watanabe, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/910,580

(22) Filed: Aug. 4, 2004

(65) Prior Publication Data
US 2005/0268188 A1 Dec. 1, 2005

(30) Foreign Application Priority Data
May 26, 2004 (JP) ............... 2004-156216

(51) Int. Cl.
*G06F 11/16* (2006.01)
*G06F 11/24* (2006.01)

(52) U.S. Cl. .................... 714/798; 714/770

(58) Field of Classification Search ............... 714/798, 714/775, 2, 6, 7, 15, 20, 770; 707/8, 200, 707/202; 710/200; 711/154, 161, 162
See application file for complete search history.

(56) References Cited

U.S. PATENT DOCUMENTS

| | | | |
|---|---|---|---|
| 5,745,915 A | 4/1998 | Cooper et al. | |
| 6,073,209 A | 6/2000 | Bergsten | |
| 6,182,198 B1 | 1/2001 | Hubis et al. | |
| 6,301,589 B1 * | 10/2001 | Hirashima et al. | 707/204 |
| 6,643,750 B2 | 11/2003 | Achiwa et al. | |
| RE38,410 E | 1/2004 | Hersch et al. | |
| 6,691,139 B2 | 2/2004 | Ganesh et al. | |
| 6,715,054 B2 | 3/2004 | Yamamoto | |
| 6,728,832 B2 | 4/2004 | Yamamoto et al. | |
| 6,732,125 B1 | 5/2004 | Autrey et al. | |
| 6,820,098 B1 | 11/2004 | Ganesh et al. | |
| 6,823,349 B1 | 11/2004 | Taylor et al. | |
| 2003/0046602 A1 * | 3/2003 | Hino et al. | 714/4 |
| 2004/0268177 A1 | 12/2004 | Ji et al. | |

FOREIGN PATENT DOCUMENTS

JP 2002-259183 9/2002

\* cited by examiner

*Primary Examiner*—Albert Decady
*Assistant Examiner*—Dipakkumar Gandhi
(74) *Attorney, Agent, or Firm*—Antonelli, Terry, Stout and Kraus, LLP.

(57) ABSTRACT

A backup system includes a first storage device having first storage areas in which an update log of recorded data is stored; a second storage device having second storage areas which are paired with the first storage areas respectively and in which a copy of the update log is stored; and a disk controller. The state of a pair of first and second storage areas is changed from a non-pair state in which the update log is not stored in the pair of first and second storage areas to a pair state. The state of another pair of first and second storage areas is changed from a pair state to a non-pair state. The disk controller includes first and second disk controllers for controlling the first and second storage devices, respectively. The changes of pair/non-pair states are executed by the first disk controller.

9 Claims, 6 Drawing Sheets

COPY STATE MANAGEMENT TABLE 101c

| FILE NAME | STATE OF USE | COPY STATE |
|---|---|---|
| LOG A1 | STANDBY | suspend |
| LOG A2 | STANDBY | suspend |
| LOG A3 | STANDBY | suspend |
| LOG A4 | ACTIVE | pair |
| LOG A5 | STANDBY | suspend |

BACKUP METHOD, BACKUP SYSTEM, DISK CONTROLLER AND BACKUP PROGRAM

INCORPORATION BY REFERENCE

The present application claims priority from Japanese application JP2004-156216 filed on May 26, 2004, the content of which is hereby incorporated by reference into this application.

BACKGROUND OF THE INVENTION

The present invention relates to a data processing technique for storing a copy of data.

As represented by a remote copy function used between storage systems, a data backup system using a main site information processing system (also referred to as "primary system") and a sub site information processing system (also referred to as "secondary system") is adopted widely in the field of disaster measures, etc. The main site information processing system and the sub site information processing system form a duplication system and have disk array devices (first and second storage devices) respectively so that data or backup data are stored in a database for each disk array device while separated by logical volumes. That is, logical volumes (first logical volumes) in which data in the main site information processing system are stored are paired with logical volumes (second logical volumes) in which backup data in the sub site information processing system are stored, so that the first logical volumes correspond to the second logical volumes respectively. A log transfer method as disclosed in JP-A-2002-259183 is used as a data backup method using such a duplication system.

The log transfer method is a method in which a data update record (hereinafter referred to as "log") in the main site information processing system is transferred to the sub site information processing system so that backup data is generated in the sub site information processing system. In the log transfer method, data in the main site information processing system and backup data in the sub site information processing system are first synchronized (mirrored) with each other at the stage of the start of a backup process. When the backup process starts, the log stored in a logical volume in the main site information processing system is transferred to the sub site information processing system. In the sub site information processing system, while the transferred log is copied into a logical volume paired with the logical volume of the main site information processing system, the newest backup data are generated on the basis of the copy of the log and stored in a logical volume of the database.

Incidentally, if a line failure occurs in the middle of data transfer between the main site information processing system and the sub site information processing system when the log transfer method is used for backing up data, the pair state between logical volumes in which the log is stored is suspended. In this case, data updating is executed only for the logical volumes of the main site information processing system, that is, data updating is not executed for the logical volumes of the sub site information processing system. Accordingly, when the line in a failure state is recovered, re-synchronization must be performed to attain recovery of the backup state in the duplication system.

To secure reliability of the duplication system in the re-synchronization at the time of recovery of the line, it is necessary to give a guarantee that the logical volumes in the sub site information processing system are prevented from being updated during the occurrence of the line failure.

SUMMARY OF THE INVENTION

In the case where this guarantee is not secured, initial copying however must be executed for all the logical volumes (storage or memory areas) in which the log is stored. In the initial copying, a copying process is made while the time series update sequence of the logical volumes is not guaranteed. For this reason, if the copying process is interrupted because a line failure etc. is caused by a disaster etc. in the middle of the initial copying, the backup state of the duplication system cannot be recovered so that all the logical volumes in both the main site and sub site information processing systems are disabled from being used.

The present invention is designed upon such circumstances and an object of the invention is to provide a backup method, a backup system, a disk controller and a backup program.

According to a chief aspect of the invention, there can be provided a backup method used in a backup system including: a first storage device having first storage areas in which an update log of recorded data is stored; a second storage device having second storage areas which are paired with the first storage areas respectively and in which a copy of the update log is stored; and a disk controller for controlling the pair state between the first storage areas and the second storage areas, the backup method being provided for backing up the data based on the disk controller, the backup method comprising the steps of: changing the state of a pair of first and second storage areas from a non-pair state in which the update log is not stored in the pair of first and second storage areas to a pair state (pairing step); and changing the state of another pair of first and second storage areas from a pair state to a non-pair state (non-pairing step).

According to the invention, the sub site can be partially recovered, so that the time required for recovery can be shortened.

Other objects, features and advantages of the invention will become apparent from the following description of the embodiments of the invention taken in conjunction with the accompanying drawings.

DESCRIPTION OF THE EMBODIMENTS

===System Configuration and Schematic Operation===

Figure 1:
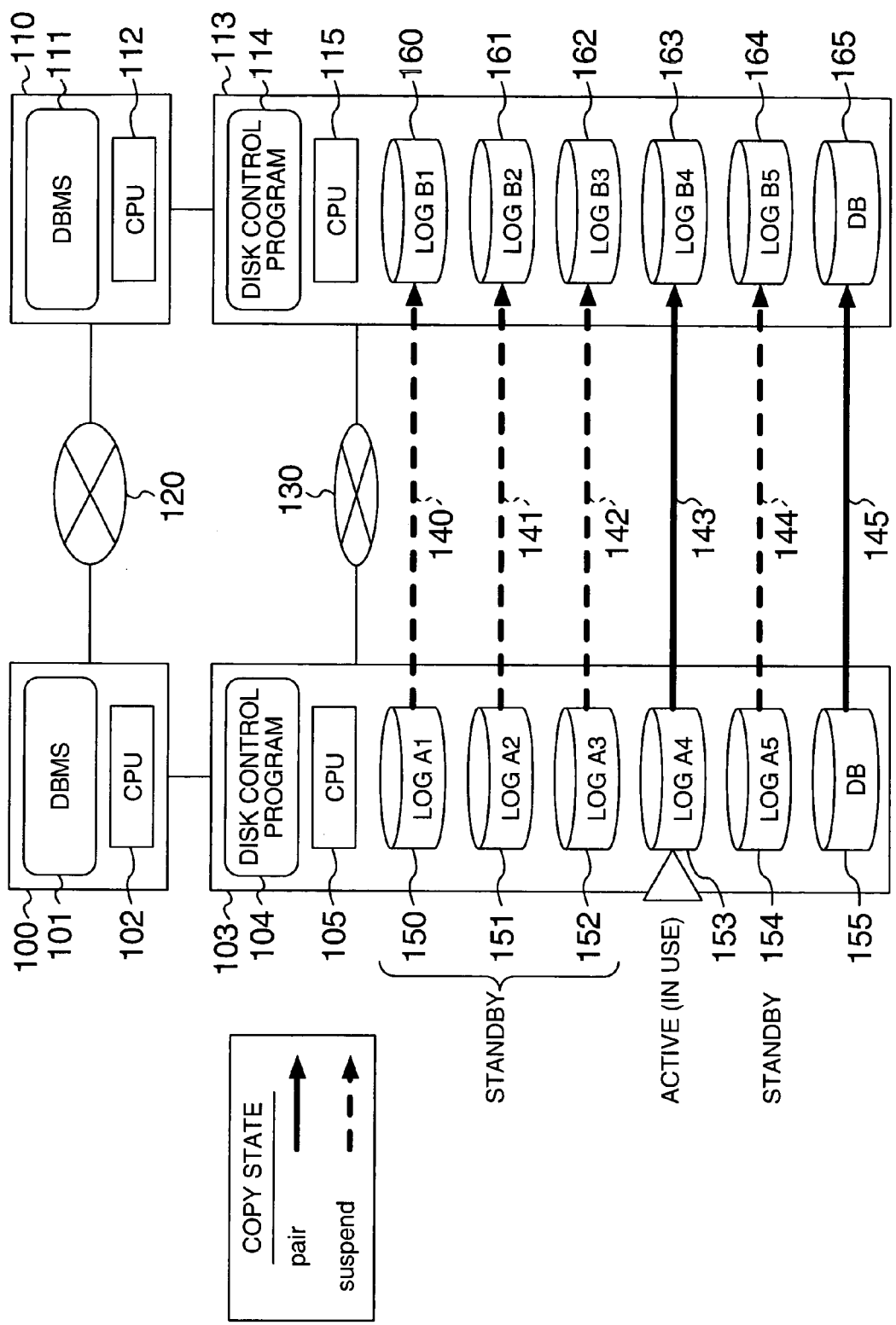
FIG. 1 is a configuration diagram of a data backup system using a duplication system according to an embodiment of the invention.

FIG. 1 is a configuration diagram of a data backup (data duplication) system using a duplication system having a main site and a sub site according to an embodiment of the invention. As shown in FIG. 1, the backup system using a duplication system has two systems, that is, a main site information processing system and a sub site information processing system. The main site information processing system is a source of backup and includes a server (first disk controller) 100, and a disk array device 103. The sub site information processing system is a destination of backup and includes a server (second disk controller) 110, and a disk array device 113. The server 100 of the main site information processing system and the server 110 of the sub site information processing system are connected to each other by a communication line (network) 120. The disk array device 103 of the main site information processing system and the disk array device 113 of the sub site information processing system are connected to each other by a communication line (network) 130.

As shown in FIG. 1, the servers 100 and 110 have database management systems 101 and 111, respectively. The database management systems 101 and 111 are achieved by software (programs or objects) operated by control of CPUs 102 and 112, respectively. The disk array device 103 has a disk control program 104 operated by control of a CPU 105, logical volumes 150 to 154 for storing logs A1 to A5 respectively, and a database 155 for storing data as a source of update. On the other hand, the disk array device 113 has a disk control program 114 operated by control of a CPU 115, logical volumes 160 to 164 for storing logs B1 to B5, respectively, and a database 165 for storing backup data as a destination of update. Each of the aforementioned programs may be provided as a thread or as a process.

In the data backup system using such a duplication system, a data backup function is achieved when the disk control programs 104 and 114 operate on the basis of instructions given from the database management systems 101 and 111 of the servers 100 and 110 in accordance with requests given from external information processors. For example, a pair of logical volumes 153 and 163 used currently (actively) are provided so that the copy state of a log A4 corresponding to updating of data in the database 155 is a pair state (logs A4 and B4). The other pairs of logical volumes 150 and 160, 151 and 161, 152 and 162, and 154 and 164 are provided so that the copy state of each log is a suspend state. Although description has been made on the case where logical volumes are used, the invention can be also applied to the case where physical volumes are used. Each logical volume is only an example functioning as a memory or storage area for storing data.

A copy operating method used for the pairs of logical volumes 150 and 160, 151 and 161, 152 and 162, 153 and 163, and 154 and 164 for storing the logs A1 to A5 and B1 to B5 is as follows. When the logs A1 and B1 stored in the pair of logical volumes 150 and 160 first beginning to be used are accumulated to be so full that the effective residual capacities of the logs A1 and B1 are eliminated, the next pair of logical volumes 151 and 161 are selected as a pair state so as to be used currently (actively) in place of the pair of logical volumes 150 and 160 while the pair of logical volumes 150 and 160 are shifted to a standby state. Then, when the pair of logical volumes 151 and 161 become full, similarly, the next pair of logical volumes 152 and 162 are selected so as to be used in place of the pair of logical volumes 151 and 161 while the pair of logical volumes 151 and 161 are shifted to a standby state. In this manner, selection of the active pair of logical volumes is executed successively in ascending order of number. When the final pair of logical volumes 154 and 164 become full, the first pair of logical volumes 150 and 160 are selected again so as to be used by means of overwriting the logs. This type operating method is also referred to as "ring buffer method". The copy operating state for the pairs of logical volumes is stored as a copy state management table 101c shown in FIG. 2 in a suitable storage portion of the database management system 101.

In this type backup method, when each inactive pair of logical volumes are set as a non-pair state so that the mirror (synchronizing) function is suspended or stopped, there can be given a guarantee that other logical volumes than active logical volumes are not subjected to another updating. Accordingly, re-synchronization can be made by a simple operation of initially copying the active pair of logical volumes. Accordingly, the number of pairs of logical volumes as a subject of initial copying required for re-synchronization can be minimized, so that the failure caused by a disaster etc. during initial copying can be prevented as sufficiently as possible.

===Details of Characteristic Configuration and Operation===

The copy operating method concerning pairs of logical volumes for storing logs will be described in detail.

<<<Main Site Information Processing System>>>

Figures 2, 3:
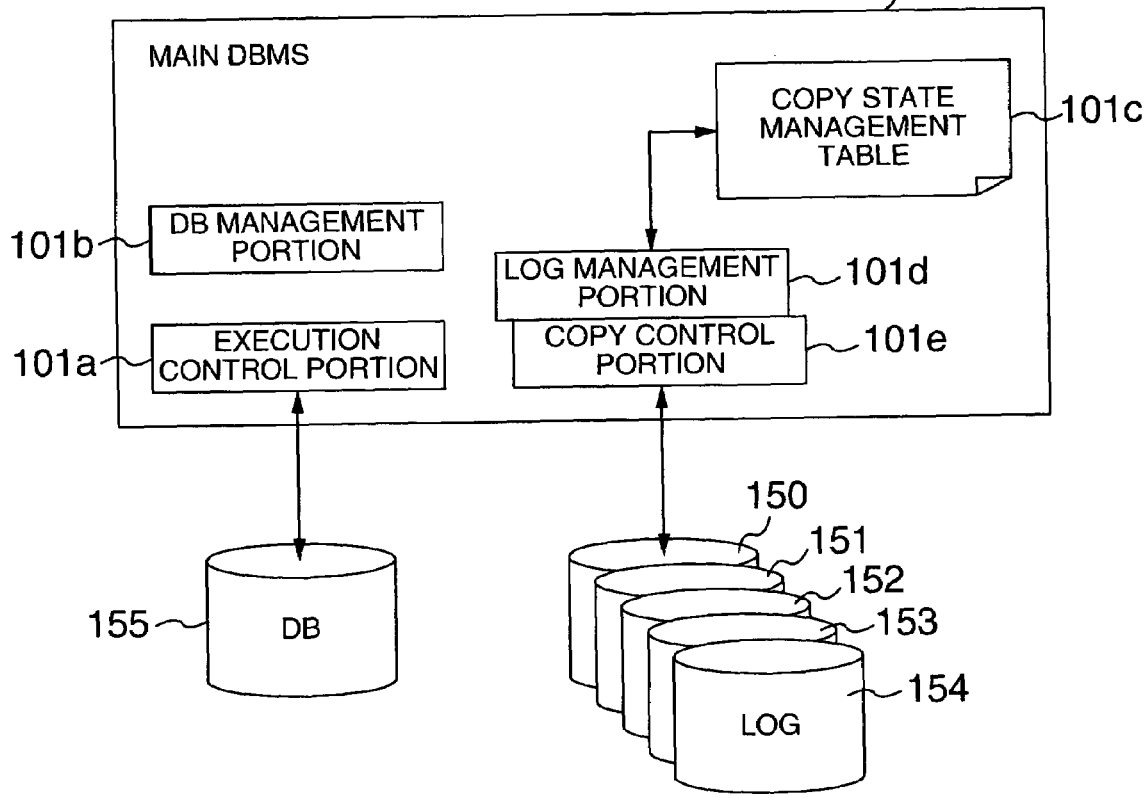
FIG. 2 is a block diagram showing a copy state management table 101c in the backup system according to the embodiment of the invention.
FIG. 3 is a functional block diagram of a database management system in a main site information processing system in the backup system according to the embodiment of the invention.

First, as shown in FIG. 3, the database management system 101 of the main site information processing system has an execution control portion 101a, a DB (database) management portion 101b, a copy state management table 101c as described above, a log management portion 101d, and a copy control portion 101e. The execution control portion 101a executes writing/reading of data into/from the database 155. The DB management portion 101b generally controls the operation of the execution control portion 101a. The log management portion 101d makes it possible to refer to the copy state management table 101c or update the copy state management table 101c in accordance with an instruction given from the copy control portion 101e. The copy control portion 101e controls the log management portion 101d to refer to the copy state management table 101c or update the copy state management table 101c. The copy control portion 101e further controls the operation of copying the logical volumes 150 to 154. Incidentally, the operation of each of the portions 101a, 101b, 101d and 101e can be achieved by execution of a program for providing the function of each portion.

Figure 4:
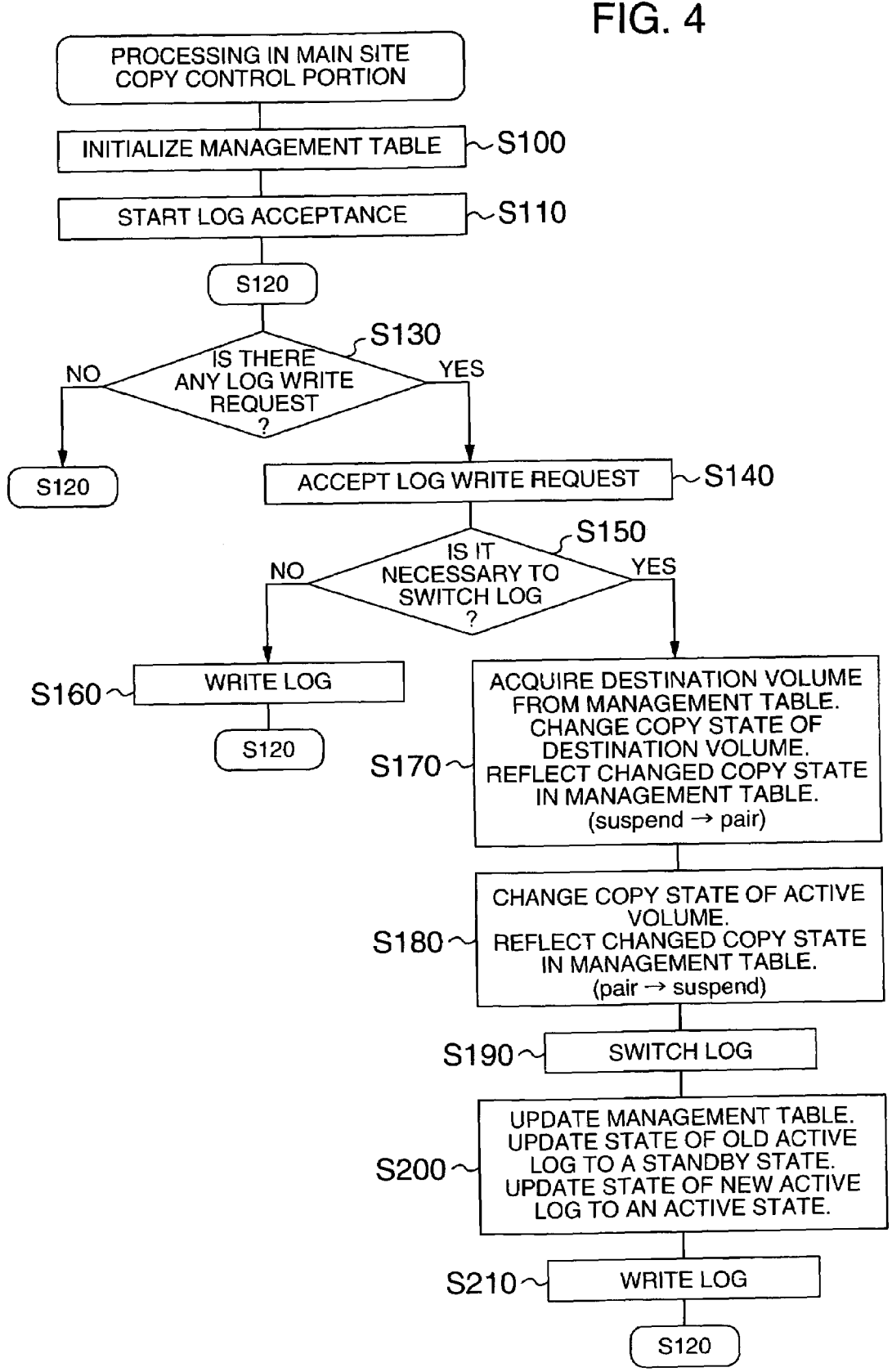
FIG. 4 is a flowchart showing the operation of the database management system in the main site information processing system in the backup system according to the embodiment of the invention.

The operation of the copy control portion 101e will be described with reference to FIG. 4 (flowchart) and FIGS. 1 and 2 to describe the copy operating state of the pairs of logical volumes more specifically. First, the copy state management table 101c is reset and initialized (S100). Acceptance of a log write request for the logical volume 153 storing the log starts for waiting for the acceptance of the request (S110→S120→S130:NO→S120). When there is a log write request, the request is accepted. If the logical volume 153 (which stores the log A4) in a pair state is not full so that the logical volume 153 need not be switched over to the next logical volume 154 (which will store the log A5), the log is written in the active logical volume 153 and a copying process is executed for the logical volume 163 paired with the logical volume 153 to attain synchronization (mirroring) for the purpose of waiting for a next write request (S130:YES→S140→S150:NO→S160→S120).

If it is necessary to switch the logical volume 153 over to the next logical volume 154 because the logical volume 153 is full, information (identifiers, etc.) concerning logical volumes concerning the next pair of logical volumes is acquired with reference to the copy state management table 101c and the copy state management table 101c is updated so that the copy state of the logical volume 154 is changed from a non-pair (suspend, stop) state to a pair (active, current) state (S150:YES→S170:pairing step) The copy state management table 101c is further updated so that the copy state of the logical volume 153 used actively before switched over to the next logical volume 154 is changed from a pair state to a suspend state (S180:non-pairing step). After the process of changing the copy state of logical volumes on the copy state management table 101c in this manner is completed, a process of actually switching logical volumes as a subject of log writing is executed (S190). With the switching of logical volumes, the state (standby or active) of use of logical volumes on the copy state management table 101c is changed (S200). That is, the state of use of the logical volume 153 is changed from an active state to a standby state while the state of use of the logical volume 154 is changed from a standby state to an active state (S210). In this manner, after the copy state management table 101c is updated with the process of switching logical volumes, the log A5 is first actually written in the logical volume 154 and a copying process is executed for the logical volume 164 paired with the logical volume 154 to generate the log B5 to thereby attain synchronization for the purpose of waiting for a next write request (S210→S120→S130→S120).

<<<Sub Site Information Processing System>>>

Figure 5:
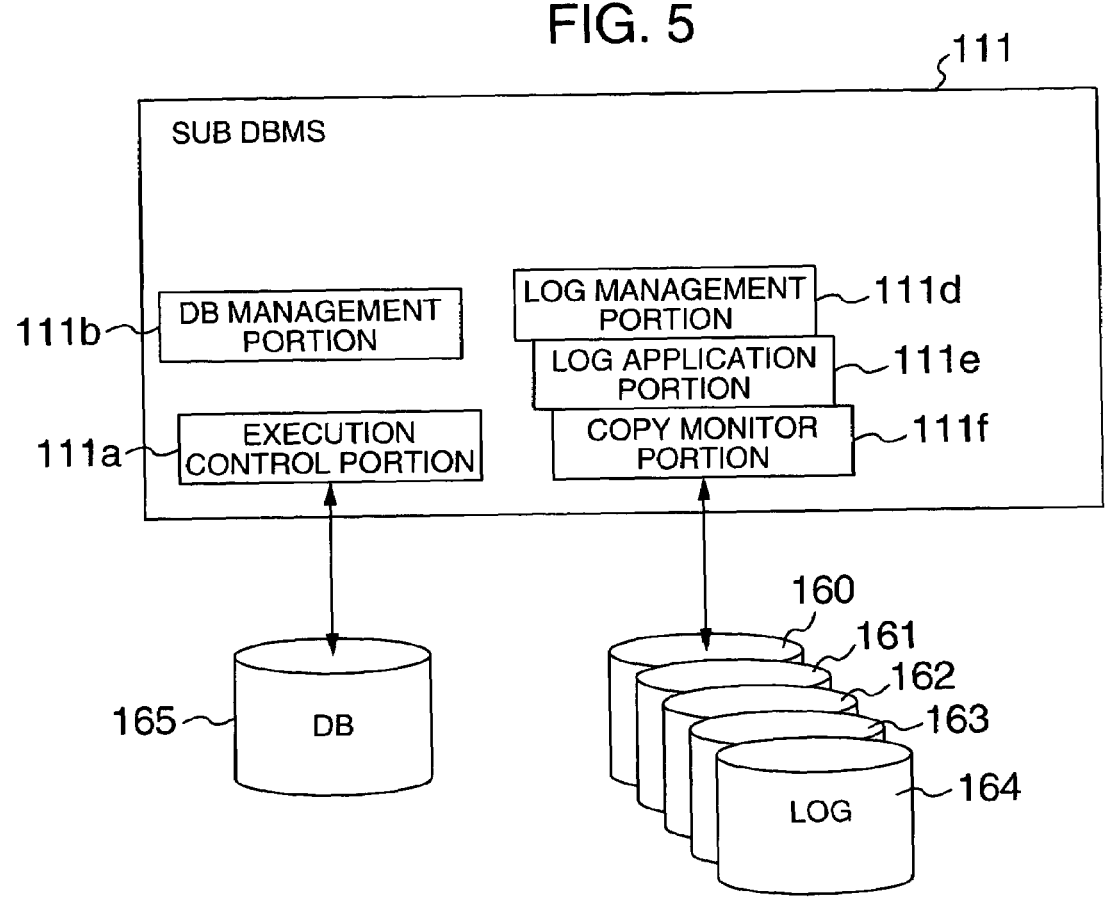
FIG. 5 is a functional block diagram of a database management system in a sub site information processing system in the backup system according to the embodiment of the invention.

First, as shown in FIG. 5, the database management system 111 of the sub site information processing system has an execution control portion 111a, a DB (database) management portion 111b, a log management portion 111d, a log application portion 111e, and a log monitor portion 111f. The execution control portion 111a executes writing/reading of backup data into/from the database 165. The DB management portion 111b generally controls the operation of the execution control portion 111a. The log management portion 111d communicates with the database management system 101 of the main site information processing system in accordance with an instruction given from the log monitor portion 111f to make it possible to refer to the copy state management table 101c. As will be described later in detail, the log application portion 111e executes a data update process of the database 165 as a log application process suitably. The log monitor portion 111f controls the log management portion 111d to acquire necessary information with reference to the copy state management table 101c of the main site information processing system. Incidentally, the operation of each of the portions 111a to 111f can be achieved by execution of a program for providing the function of each portion.

Figure 6:
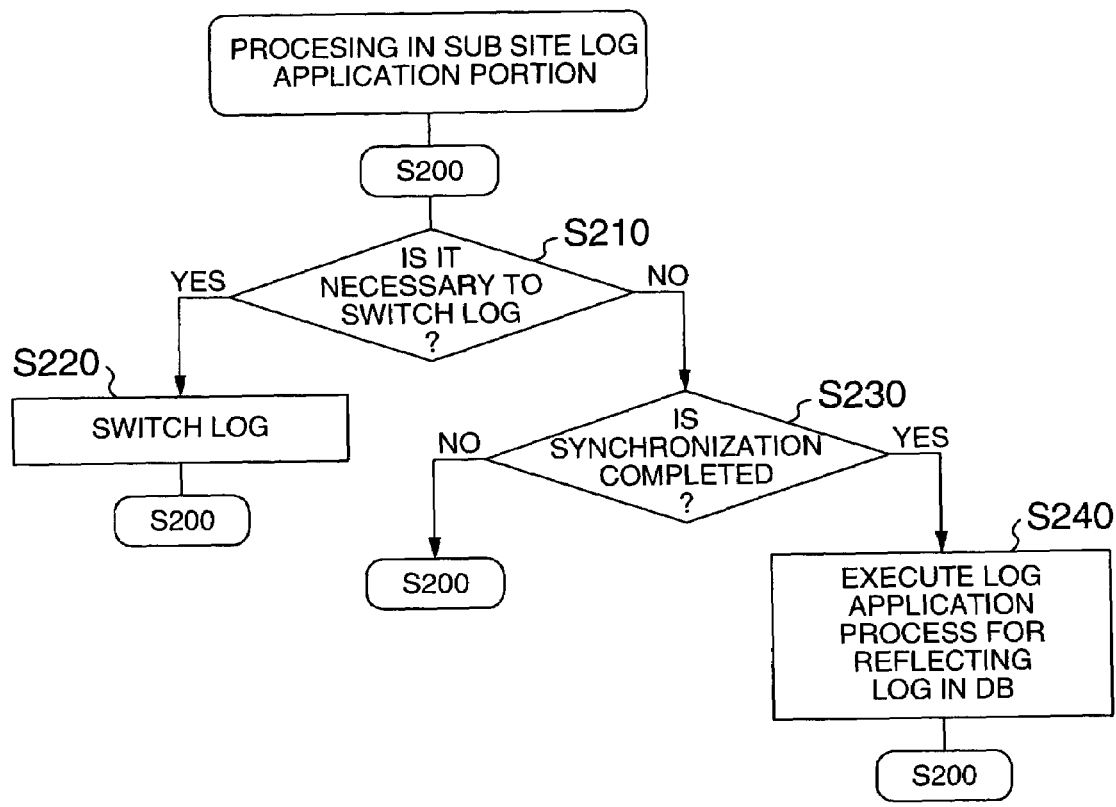
FIG. 6 is a flowchart showing the operation of the database management system in the sub site information processing system in the backup system according to the embodiment of the invention.
Figure 7:
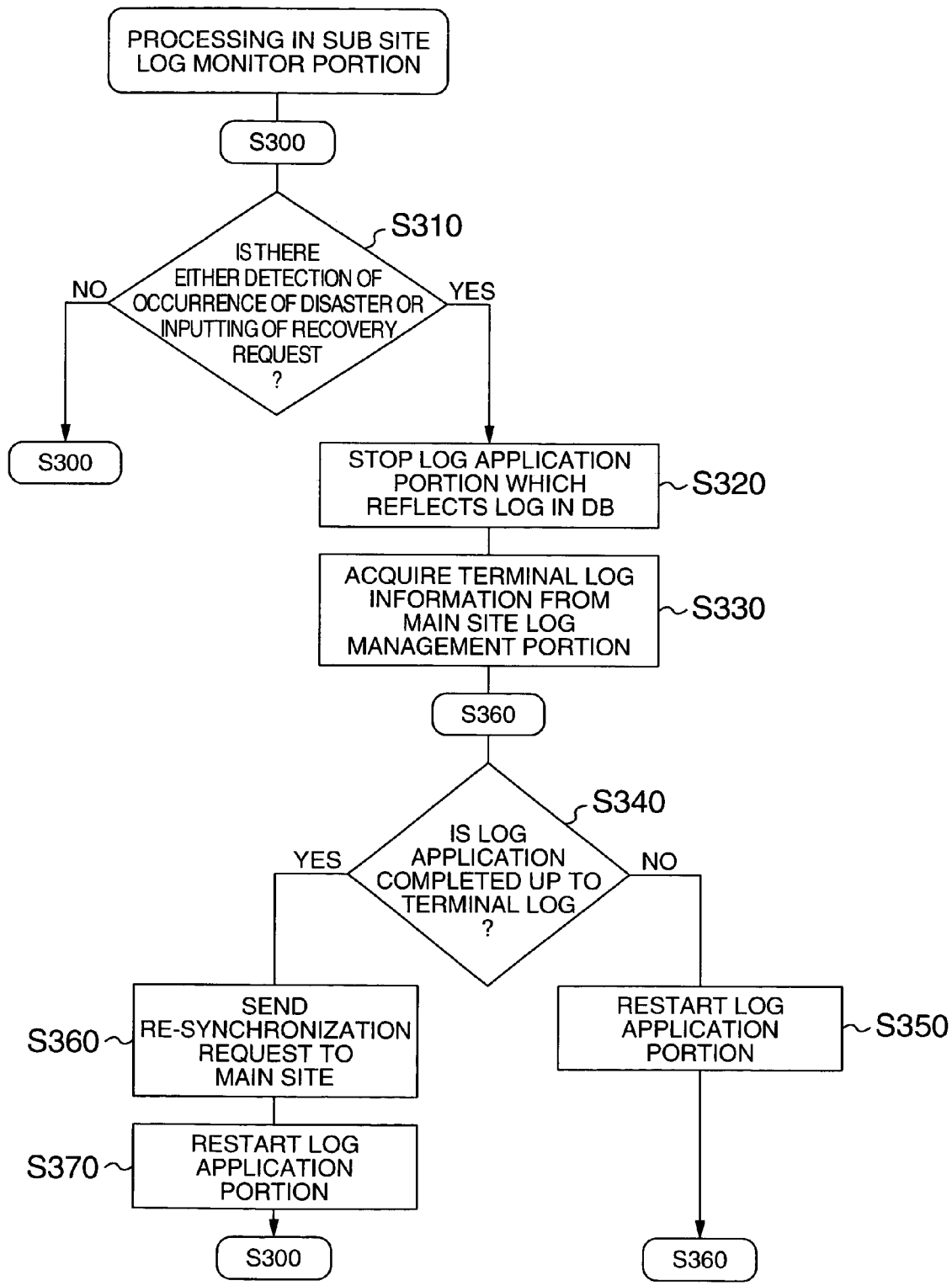
FIG. 7 is a flowchart showing the operation of the database management system in the sub site information processing system in the backup system according to the embodiment of the invention.

The operations of the log application portion 111e and the log monitor portion 111f will be described with reference to FIG. 6 or 7 (flowchart) and FIGS. 1 and 5 to describe the copy operating state of the pairs of logical volumes more specifically.

The operation of the log application portion 111e will be described first. The log application portion 111e communicates with the log management portion 101d of the main site information processing system through the log management portion 111d so that reference to the copy state management table 101c is obtained to judge whether it is necessary to switch the log or not. When a result of the reference leads to the conclusion that the logical volume 153 in a pair state needs to be switched over to the next logical volume 154, a log switching process is executed accordingly to shift the logical volumes 163 and 164 to a standby state and an active state, respectively and then the current position of the routine goes back to the judgment as to whether it is necessary to switch the log or not (S200→S210: YES→S220→S200). On the other hand, when it is unnecessary to switch the log (S210:NO) and the log copying process, for example, between the logical volumes 153 and 163 in a pair state is completed so that the logical volumes 153 and 163 are synchronized with each other (S230:YES), a process of updating backup data in the database 165 is executed as a log application process on the basis of the log B4 stored in the logical volume 163 and then the current position of the routine goes back to the judgment as to whether it is necessary to switch the log or not (S240→S200→S210). When the step S230 makes a decision that the logical volumes 153 and 163 are not synchronized with each other (S230:NO), the current position of the routine goes back to the judgment as to whether it is necessary to switch the log or not (S200→S210).

Next, the operation of the log monitor portion 111f will be described. When a disaster occurs in the communication line 130 connecting the disk array device 103 of the main site information processing system and the disk array device 113 of the sub site information processing system to each other, a disaster notice or a disaster recovery request is sent to the log monitor portion 111f through the communication line 120 connecting the servers 100 and 110 to each other. When the disaster notice or the disaster recovery request is sent from the server 100 to the log monitor portion 111f (S310: YES), the operation of the log application portion 111e for updating the database 165, for example, based on the log B4 stored in the active logical volume 163 is stopped (S320). Information indicating the terminal of the log (hereinafter referred to as "terminal log information" or "updated record terminal information") at the point of time when the operation of the log application portion 111e for updating the database 165, for example, based on the log B4 stored in the active logical volume in a pair state is stopped in S320 is acquired from the log management portion 101d of the main site information processing system (S330). A judgment is made on the basis of the acquired terminal log information as to whether the log application process (the process of updating the database 165) up to the terminal of the log (hereinafter referred to as "terminal log") at the point of time of the stop is completed or not (S340). When the process is not completed (S340:NO), the operation of the log application portion 111e stopped in S320 is restarted (S350→S360→S340, backup process restart step) so that the log application process is completed (S340:YES). When the step S340 makes a decision that the log application process up to the terminal log is completed (S340:YES), a request is given to the main site information processing system to perform re-synchronization with respect to the log.

In this case, as described above, the main site information processing system and the sub site information processing system can be synchronized with each other when initial copying is made between a pair of logical volumes in a pair state at the point of time of occurrence of the disaster. That is, it is unnecessary to perform initial copying between the other pairs of logical volumes in a suspend state. Then, the operation of the log application portion 111e is restarted (S370) and the current position of the routine goes back to a state of waiting for a disaster notice or a disaster recovery request (S370→S300→S310:NO→S300).

Because the log is written sequentially, the write characteristic of the log is as follows. The last position of the log written in the logical volume on the sub site is stored as the terminal log at the time of occurrence of a disaster. Accordingly, when log data next to data corresponding to the terminal log in the logical volume on the sub site (i.e. the last data reflected in the logical volume on the sub site because of the disaster) is written on the main site, data in the logical volume on the main site can be reflected in the logical volume on the sub site. That is, the data content of the logical volume on the sub site can be made the same as that of the logical volume on the main site. In this configuration, each logical volume on the sub site can be not wholly but partially recovered.

As described above, after the log application process up to the terminal log in the logical volume on the main site is completed, re-synchronization of the log is executed. For this reason, data missing can be prevented from being caused by the start of re-synchronization of the log in the case where the log application process up to the terminal log is not completed. Accordingly, data missing at the time of occurrence of a disaster etc. occurs in the communication line 130 can be minimized.

A method of acquiring the terminal log information is as follows. The terminal log information is stored in a non-volatile memory at any time by the operation of the log management portion 101d of the main site information processing system. The write position of the log written normally in the logical volume in the disk array device 113 of the sub site information processing system is specified by reference to the terminal log information stored in the nonvolatile memory. Specifically, record ID or record number concerning the last log written just before the occurrence of the disaster can be used as the terminal log information.

When a pair of logical volumes in the first and second storage devices need to be switched as a subject of storage of data update records, the state of the active pair is changed to a non-pair state, that is, a suspend state. As a result, there can be given a guarantee that the other pairs of logical volumes than the active pair are not updated separately. Accordingly, re-synchronization can be made when initial copying is made only for the active pair of logical volumes. Accordingly, the number of logical volume pairs required as a subject of initial copying for re-synchronization can be minimized, so that failure caused by a disaster etc. during the initial copying can be prevented as sufficiently as possible.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A backup method used in a backup system in which a primary system and a secondary system are connected via a first communication link, the primary system including a primary database management system (DBMS) and a primary storage device, the secondary system including a secondary DBMS and a secondary storage device, the primary and the secondary storage devices being connected via a second communication link, the primary storage device including a primary database (DB) and a plurality of primary logical log volumes each storing a plurality of log records, the secondary storage device including a secondary DB which is a backup volume of the primary DB, and a plurality of secondary logical log volumes each storing a plurality of log records, the backup method for duplicating log records from the primary system to the secondary system, comprising:

(a) forming a plurality of logical log volume pairs, with each logical log volume pair including a primary logical log volume of the primary logical log volumes and a secondary logical log volume of the secondary logical log volumes;

(b) providing, on a side of the primary system, a management table for storing states of the logical log volume pairs;

(c) setting one of the logical log volume pairs to an active state, while setting other logical log volume pairs to a standby state, and storing the states thus set to the management table;

(d) storing, on the side of the primary system, a log record in a primary logical log volume of the active-state log volume pair;

(e) sending the log record thus stored from the primary storage device to the secondary storage device via the second communication link until the primary logical log volume of the active-state log volume pair is fulfilled with log records;

(f) receiving, on a side of the secondary system, the log record sent from the primary storage device, storing the log record thus received in the secondary logical log volume of the active-state log volume pair, and performing an update operation to the secondary DB based on the log records stored in the secondary logical log volume of the active-state log volume pair;

(g) when the primary logical log volume of the active-state log volume pair is fulfilled, setting in a ring buffer manner, on the side of the primary system, another one of the logical log volume pairs to an active state, while setting the prior active-state log volume pair in which the primary logical log volume is fulfilled to a standby state, and storing the states thus set to the management table to update the management table; and (h) releasing the logical log volume pair thus fulfilled, and executing the operations (d) to (g).

2. The backup method according to claim 1, comprising:

(i) when a failure occurs on the second communication link during execution of the operation (h), storing, on the side of the primary system, terminal log information identifying a terminal log record having been stored in a primary logical log volume of the active-state log volume pair at a point of time when the failure occurred, and sending a notice of an occurrence of the failure from the primary system to the secondary system via the first communication link;

(j) receiving the notice on the side of the secondary system, stopping the update operation of the secondary DB, acquiring the terminal log information from the primary system via the first communication link, and determining whether the secondary DB has been updated by the terminal log record, based on the terminal log information thus acquired; and (k) if the secondary DB has not been updated by the terminal log record, performing, on the side of the secondary system, the update operation up to the terminal log record, and if the secondary DB has been updated by the terminal log record, requesting synchronization of logs to the primary system.

3. The backup method according to claim 2, wherein the terminal log information includes a record identifier or a record number concerning the terminal log record.

4. A backup system comprising:
a primary system;
a secondary system; and
a first communication link connecting the primary and secondary systems,
wherein the primary system includes a primary database management system (DBMS) and a primary storage device, the primary storage device including a primary database (DB) and a plurality of primary logical log volumes each storing a plurality of log records,
wherein the secondary system includes a secondary DBMS and a secondary storage device, the primary and the secondary storage devices being connected via a second communication link, the secondary storage device including a secondary DB which is a backup volume of the primary DB, and a plurality of secondary logical log volumes each storing a plurality of log records,
wherein the backup system for duplicating logs from the primary system to the secondary system executes:
(a) forming a plurality of logical log volume pairs, with each logical log volume pair including a primary logical log volume of the primary logical log volumes and a secondary logical log volume of the secondary logical log volumes;
(b) providing, on a side of the primary system, a management table for storing states of the logical log volume pairs;
(c) setting one of the logical log volume pairs to be an active state, while setting other logical log volume pairs to a standby state, and storing the states thus set to the management table;
(d) storing, on the side of the primary system, a log record in a primary logical log volume of the active-state log volume pair;
(e) sending the log record thus stored from the primary storage device to the secondary storage device via the second communication link until the primary logical log volume of the active-state log volume pair is fulfilled with log records;
(f) receiving, on a side of the secondary system, the log record sent from the primary storage device, storing the log record thus received in the secondary logical log volume of the active-state log volume pair, and performing an update operation to the secondary DB based on the log records stored in the secondary logical log volume of the active-state log volume pair;
(g) when the primary logical log volume of the active-state log volume pair is fulfilled, setting in a ring buffer manner, on the side of the primary system, another one of the logical log volume pairs to an active state, while setting the prior active-state log volume pair in which the primary logical log volume is fulfilled to a standby state, and storing the states thus set to the management table to update the management table; and
(h) releasing the logical log volume pair thus fulfilled, and executing the operations (d) to (g).

5. The backup system according to claim 4, wherein the backup system executes:
(i) when a failure occurs on the second communication link during execution of the operation (h), storing, on the side of the primary system, terminal log information identifying a terminal log record having been stored in a primary logical log volume of the active-state log volume pair at point of time when the failure occurred, and sending a notice of an occurrence of the failure from the primary system to the secondary system via the first communication link;
(j) receiving the notice on the side of the secondary system, stopping the update operation of the secondary DB, acquiring the terminal log information from the primary system via the first communication link, and determining whether the secondary DB has been updated by the terminal log record, based on the terminal log information thus acquired; and
(k) if the secondary DB has not been updated by the terminal log record, performing, on the side of the secondary system, the update operation up to the terminal log record, and if the secondary DB has been updated by the terminal log record, requesting synchronization of logs to the primary system.

6. The backup system according to claim 5, wherein the terminal log information includes a record identifier or a record number concerning the terminal log record.

7. A program stored on a machine-readable storage medium used in a backup system in which a primary system and a secondary system are connected via a first communication link, the primary system including a primary database management system (DBMS) and a primary storage device, the secondary system including a secondary DBMS and a secondary storage device, the primary and the secondary storage devices being connected via a second communication link, the primary storage device including a primary database (DB) and a plurality of primary logical log volumes each storing a plurality of log records, the secondary storage device including a secondary DB which is a backup volume of the primary DB, and a plurality of secondary logical log volumes each storing a plurality of log records, the computer program for duplicating logs from the primary system to the secondary system, comprising:
(a) forming a plurality of logical log volume pairs, with each logical log volume pair including a primary logical log volume of the primary logical log volumes and a second logical log volume of the secondary logical log volumes;
(b) providing, on a side of the primary system, a management table for storing states of the logical log volume pairs;
(c) setting one of the logical log volume pairs to be an active state, while setting other logical log volume pairs to a standby state, and storing the states thus set to the management table;
(d) storing, on the side of the primary system, a log record in a primary logical log volume of the active-state log volume pair;
(e) sending the log record thus stored from the primary storage device to the secondary storage device via the second communication link until the primary logical log volume of the active-state log volume pair is fulfilled with log records;
(f) receiving, on a side of the secondary system, the log record sent from the primary storage device, storing the log record thus received in the secondary logical log volume of the active-state log volume pair, and performing an update operation to the secondary DB based on the log records stored in the secondary logical log volume of the active-state log volume pair;

(g) when the primary logical log volume of the active-state log volume pair is fulfilled, setting in a ring buffer manner, on the side of the primary system, another one of the logical log volume pairs to an active state, while setting the prior active-state logical log volume pair in which the primary logical log volume is fulfilled to a standby state, in a ring buffer manner, and storing the states thus set to the management table to update the management table; and (h) releasing the logical log volume pair thus fulfilled, and executing the operations (d) to (g).

8. The program according to claim 7, wherein the program comprises:

(i) when a failure occurs on the second communication link during execution of the operation (h), storing, on the side of the primary system, terminal log information identifying a terminal log record having been stored in a primary logical log volume of the active-state log volume pair at point of time when the failure occurred, and sending a notice of an occurrence of the failure from the primary system to the secondary system via the first communication link;

(j) receiving the notice on the side of the secondary system, stopping the update operation of the secondary DB, acquiring the terminal log information from the primary system via the first communication link, and determining whether the secondary DB has been updated by the terminal log record, based on the terminal log information thus acquired; and (k) if the secondary DB has not been updated by the terminal log record, performing, on the side of the secondary system, the update operation up to the terminal log record, and if the secondary DB has been updated by the terminal log record, requesting synchronization of logs to the primary system.

9. A backup method used in a backup system in which a primary system and a secondary system are connected via a first communication link, the primary system including a primary database management system (DBMS) and a primary storage device, the secondary system including a secondary DBMS and a secondary storage device, the primary and the secondary storage devices being connected via a second communication link, the primary storage device including a primary database (DB) and a plurality of primary logical log volumes each storing a plurality of log records, the secondary storage device including a secondary DB which is a backup volume of the primary DB, and a plurality of secondary logical log volumes each storing a plurality of log records, the backup method for duplicating logs from the primary system to the secondary system comprising:

(a) forming a plurality of logical log volume pairs, with each logical log volume pair including a primary logical log volume of the primary logical volumes and a secondary logical log volume of the secondary logical log volumes;

(b) providing a management table for storing states of the log volume pairs;

(c) setting one of the logical log volume pairs to an active state, while setting other logical log volume pairs to a standby state, and storing the states thus set to the management table;

(d) storing, on the side of the primary system, a log record in a primary logical log volume of the active-state log volume pair;

(e) sending the log record thus stored from the primary storage device to the secondary storage device via the second communication link until the primary logical log volume of the active-state log volume pair is fulfilled with log records;

(f) receiving, on a side of the secondary system, the log record sent from the primary storage device, storing the log record thus received in the secondary logical log volume of the active-state log volume pair, and performing an update operation to the secondary DB based on the logs stored in the secondary logical log volume of the active-state log volume pair;

(g) when the primary logical log volume of the active-state log volume pair is fulfilled, setting, in a ring buffer manner, another one of the logical log volume pairs to an active state, while setting the prior active-state log volume pair in which the primary logical log volume is fulfilled to a standby state, and storing the states thus set to the management table to update the management table; and (h) releasing the logical log volume pair thus fulfilled, and executing the operations (d) to (g).

* * * * *